UNITED STATES PATENT OFFICE.

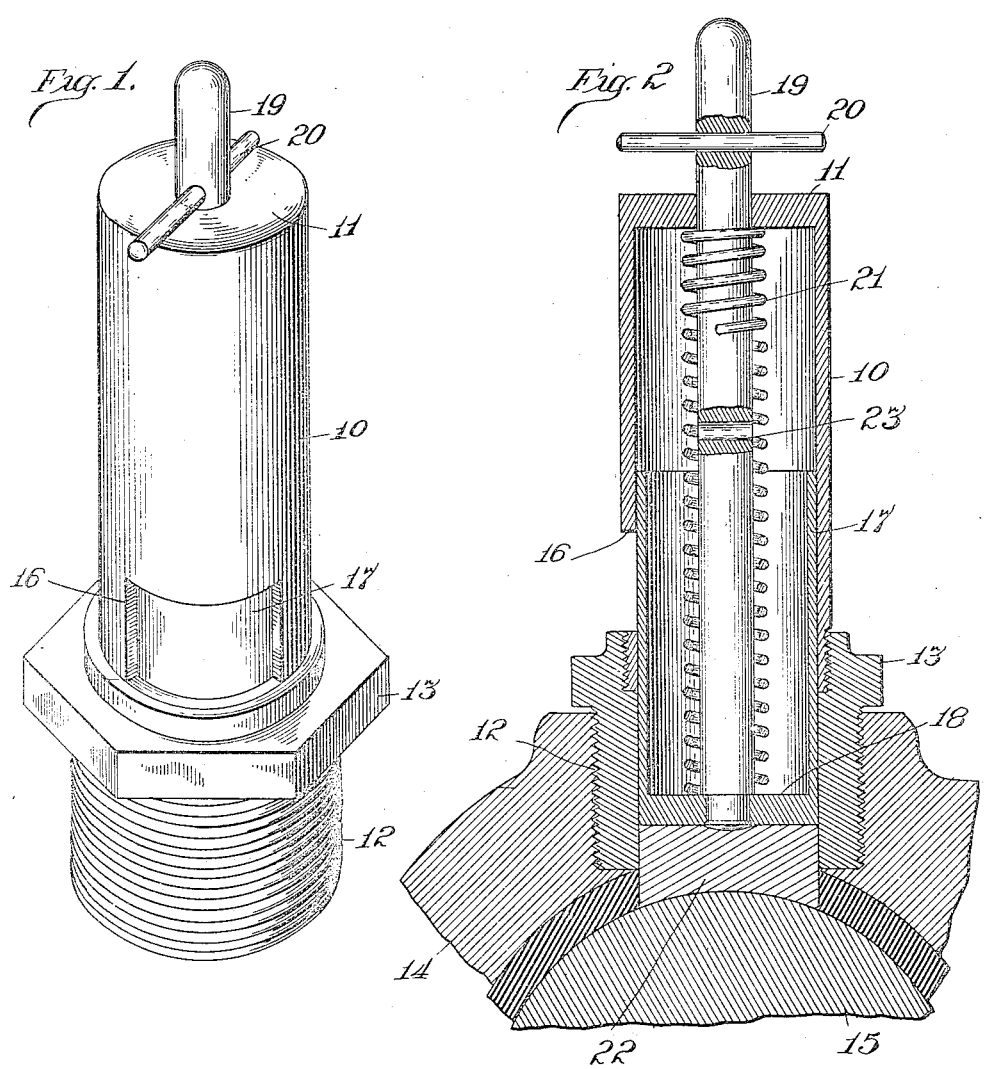

GEORGE S. GARREN, OF OAK PARK, ILLINOIS, ASSIGNOR TO SARGENT COMPANY, OF CHICAGO, ILLINOIS, A CORPORATION OF ILLINOIS.

GREASE-CUP.

1,277,059.   Specification of Letters Patent.   Patented Aug. 27, 1918.

Application filed December 5, 1917. Serial No. 205,511.

*To all whom it may concern:*

Be it known that I, GEORGE S. GARREN, a citizen of the United States, and a resident of Oak Park, in the county of Cook and State of Illinois, have invented certain new and useful Improvements in Grease-Cups, of which the following is a description.

My invention relates to a lubricant-holding device or cup more especially adapted for use in connection with locomotive journals or bearings, and particularly the bearings between the connecting rods and crank-pins of locomotives and the like, where a relatively large quantity of lubricant or grease is necessary.

The object of the invention is to provide a grease-cup adapted to contain a suitable supply of lubricant and grease which will be automatically fed to the bearings in constant adequate quantities; the construction being such that the entire contents of the cup or container will be under a constant uniform pressure and will be entirely expelled through the proper passages leading to the bearings without loss of any grease or lubricant.

Another object of the invention is to provide a self-contained construction, wherein the respective operating parts are so arranged within a suitable housing or shell, that the device may be readily recharged or filled without disconnecting any of the respective parts; the construction thus obviating the possibility of any of the parts becoming loose and mislaid or lost.

A further object of the invention is to provide a construction adapted to withstand extreme conditions of wear and exposure, and wherein the lubricant or grease will be protected from dirt or other foreign matter, which is therefore also prevented from reaching the bearings.

In addition to the above enumerated purposes and advantages, the invention contemplates a device which is simple in construction and which may be readily assembled and applied, as will be apparent from the following detailed description of the accompanying drawing, wherein:—

Figure 1 is a perspective view, in elevation, of my improved grease cup.

Fig. 2 is a longitudinal sectional view thereof, showing the same applied to a connecting-rod and crank-pin of a locomotive of which only portions, in section, are shown.

In the particular exemplification of the invention, the outer casing or holder is preferably shown in the nature of a cylindrical shell or hollow member 10, closed at one end, by the preferably integral end wall 11. The opposite end of the shell is open and this end of the cylindrical wall is shown provided with external threads adapted to screw into the coupling member or nipple 12, provided with suitable wrench-receiving surfaces at 13, as clearly shown in Fig. 1. The coupling member or nipple 12 is preferably externally threaded, as shown, so as to adapt it to screw into a suitable tapped opening in the member or connecting rod, shown at 14 in Fig. 2, or other element to be lubricated. The rod is preferably shouldered, as shown, to provide a suitable flat surface to receive and form a proper seat for the coupling or nipple 12. The connecting-rod 14 is provided with the usual lubricant-passage or aperture extending therethrough so as to establish communication with the crank-pin, or journal, or other suitable element, indicated at 15, whereby the lubricant or grease is conveyed to the bearing surfaces of the pin or journal and the rod. The shell or casing 10, at a suitable point, preferably immediately above the connecting member or nipple 12, is provided with a slot or segmental port 16 to permit insertion of the lubricant, which is preferably in the nature of a heavy or semi-solid grease in the form of a lozenge or cake. The shell or casing 10 is provided with a plunger 17, of the same cross-sectional contour as the inner cross-sectional contour of the shell or casing 10, and therefore, in the particular exemplification, is shown in the nature of a cylinder, closed at the lower end 18, and made of a length preferably somewhat greater than the distance from the bottom of the connecting member or nipple 12 to a point slightly above the opening or segmental port 16 in the outer shell or casing 10. The outer shell or casing 10 is therefore also preferably made of a length sufficient to accommodate the plunger 17 above the opening or port 16, in order that the opening into the outer shell may be completely uncovered and unobstructed when the plunger 17 has been retracted or drawn up to the upper end of the shell or casing and it is desired to fill or load the cup or holder. The side wall of plunger 17 is shown formed integral with the bottom or end 18, and the side wall is shown continuously about the inner surface of the outer shell, although it is apparent that such need not be the case; it being merely essential that the side portion or guard be of such dimensions and construction that the port will be at all times covered while the device is in feeding condition. The lower end 18 of the plunger 17 is provided with a stem 19, riveted or otherwise secured to the plunger, and disposed vertically through the hollow plunger and the shell 10, and extending a slight distance beyond the upper end 11 of the outer shell when the plunger is at its lowermost point in the cup. The upper outer end of the stem 19 is formed or provided with a suitable grasp, which may be in the nature of a pin 20 disposed transversely through the stem 19. The pin enables the plunger to be drawn upwardly to the upper end of the shell or casing; the pin at the same time preventing the plunger from dropping out through the lower open end of the device before the outer shell or casing has been screwed into place. The stem 19, within the shell or casing 10, is encircled by a long coil-spring 21, one end whereof bears against the end 18 of plunger 17, while the other end bears against the lower side of the end 11 of the outer shell or casing 10. The spring 21 is caused to exert a constant downward pressure on the plunger 17, which, in turn, is induced to exert a constant pressure on the lubricant or grease, which is indicated at 22 in Fig. 2.

As is apparent from the construction shown and described, the cup, or the nipple portion thereof, is first screwed into the tapped opening provided in the connecting-rod, or other element, until accidental removal thereof is impossible. The plunger 17 is then drawn up against the action of spring 21 until the port or opening 16 has been completely uncovered, when the lubricant or grease may be inserted into the cup; the quantity being preferably such that the lubricant will be substantially flush with the lower end of opening or port 16, when the plunger may be released and allowed to recede, through the action of spring 21, until it comes into contact with the lubricant and places the same under pressure. As is clearly evident, this manner of manipulation, causes the plunger to completely shut off ingress into the casing or shell through the opening or port 16 and thus prevents any foreign substance entering the grease cup. As is apparent from the construction shown, the opening or port 16, except when the grease cup is being loaded, will at all times remain covered so that foreign matter will be prevented from coming into contact with the lubricant and therefore prevented from eventually coming into contact with the bearings.

In order that the plunger 17 may be retained in its raised position against the action of the spring 21, the stem 19 of the plunger may be provided with a hole 23, see Fig. 2, at a distance sufficiently above the upper end of the plunger 17, in order that the hole 23 will become exposed above the end wall 11 of outer shell or casing 10 and permit the insertion of a pin, or other suitable element, whereby the plunger will be maintained in its raised position against the action of the spring.

I have shown the grease cup preferably formed with the outer shell or casing 10 removably secured to the lower connecting portion or nipple 12, but it is clearly apparent that these two portions may be formed integral if desired without in any way affecting the operation of my improved grease cup. The grease cup permits refilling without the necessity of disconnecting any of the parts thereof, thus eliminating the possibility of any of the parts becoming mislaid or lost. Furthermore, the construction herein shown and described enables the entire quantity of grease or lubricant placed into the cup to be fed to the bearings and therefore consumed, thus providing a very economically operable construction; and a construction which will obviate the loss of lubricant, a condition encountered in constructions where the feeding pressure, from time to time, is manually applied.

I have shown and described what I believe to be the simplest embodiment of my invention, but the same may be modified in certain respects without, however, departing from the spirit of the invention.

What I claim is:—

1. A grease cup, comprising an elongated shell or casing having a closed end while the other, open end is adapted to be secured to the element to be lubricated, the side wall of said shell or casing being provided with an opening or port, an elongated plunger arranged in sliding relation with the inner walls of said shell or casing, the length of the plunger and the distance between the lower end of the shell or casing and the upper end of said side opening or port being correlated, said plunger being controllable from the casing exterior, and means whereby the plunger is maintained under constant pressure.

2. A grease cup, comprising a hollow member having a closed upper end, while the other end is open, the side wall of said member being provided with an opening or port, a spring controlled plunger reciprocatingly mounted in the member adapted to travel entirely to the open end of said member, and means movable with the plunger, whereby said opening or port is kept covered throughout the feeding movement of said plunger.

3. A grease cup, comprising an outer shell or casing closed at one end while the other, open end, is threaded to adapt it to screw into a threaded opening in the element to be lubricated, the side shell or casing being provided with an opening through which the shell or casing is adapted to be charged, an elongated plunger slidably mounted in said shell or casing in intimate relation with the inner walls thereof and of a length somewhat greater than the distance between the lower end of the outer shell or casing and the upper end of said side opening, the plunger being provided with a stem disposed through an opening in the closed end of the outer shell or casing, the outer end of said stem being formed to provide a grasp adapted to prevent passage of said stem entirely into said shell or casing, and a coil-spring intermediate of the closed end of said shell or casing and said plunger whereby the latter is maintained under constant pressure.

4. A grease cup, comprising an outer shell or cylinder closed at one end, a connecting member or nipple secured to the other open end of the cylinder, the side wall of the cylinder being provided with an elongated circumferentially disposed port or slot through which the cylinder is adapted to be charged, a cylindrical plunger slidably mounted in the shell or cylinder and of a length somewhat greater than the distance between the upper end of said port or slot and the lower end of said connecting member or nipple, the cylindrical plunger being closed at its lower end, a stem secured to the closed end of said plunger and disposed through the end wall of said outer shell or cylinder, means secured to the outer end of said stem to constitute a grasp and prevent the withdrawal of the stem into the shell or cylinder, and a coil-spring disposed about said stem intermediate of the closed end of the plunger and the closed end of said outer shell or cylinder whereby the plunger is maintained under constant pressure.

5. A grease cup, comprising an outer shell or casing closed at one end while the other, open end, is adapted to be secured to the element to be lubricated, the side wall of the shell or casing being provided with a transversely disposed port or opening through which the casing is charged, a plunger slidably mounted within the casing and provided with a side wall of a length substantially equal to the distance between the lower end of the outer shell or casing and the upper side of said port or opening so as to normally close off ingress into the shell or casing, means secured to the plunger and extending to the casing exterior whereby the plunger may be manipulated, and means whereby the plunger is maintained under constant pressure.

6. A grease cup, comprising an externally threaded connecting member or nipple having a wrench-engaging surface, one end of the nipple or connecting member being internally threaded, an outer shell or casing closed at one end while the other, open end is adapted to screw into the internally threaded end of said connecting member or nipple to form a grease or lubricant-holding receptacle therewith, the casing being provided at an intermediate point with an elongated transversely disposed port or opening through which the receptacle is charged, an elongated plunger slidably mounted in said receptacle and in intimate relation with the inner walls thereof, said plunger being of a length substantially equal to the distance intermediate of the lower end of the receptacle and the upper end of said port or opening so as to normally close off said port or opening, the plunger being provided with an elongated stem disposed through the closed end of said casing, with the outer end of said stem provided with a grasp-forming portion whereby withdrawal of said stem through the closed end of said outer casing is normally prevented, and a spring concentrically arranged about said stem intermediate of the closed end of the casing and the plunger whereby the latter is maintained under constant pressure.

7. A grease cup, comprising an elongated shell or casing having a closed end, while the other open end is adapted to be secured to the element to be lubricated, the side wall of said shell or casing being provided with an opening or port, an elongated plunger arranged in intimate relation with the inner walls of said shell or casing, the length of the plunger being slightly greater than the distance between the lower end of the shell or casing and the upper end of said side opening or port, said plunger being controllable from the casing exterior, means whereby the plunger is maintained under constant pressure, and means whereby the plunger may be maintained in retracted or inoperative position.

GEORGE S. GARREN.

Witnesses:
GEORGE HEIDMAN,
F. A. FLORELL.